Sept. 15, 1953  M. J. KLETSKY  2,652,023
PAINT SPRAY MASK FOR AUTO TIRES
Filed Aug. 17, 1951
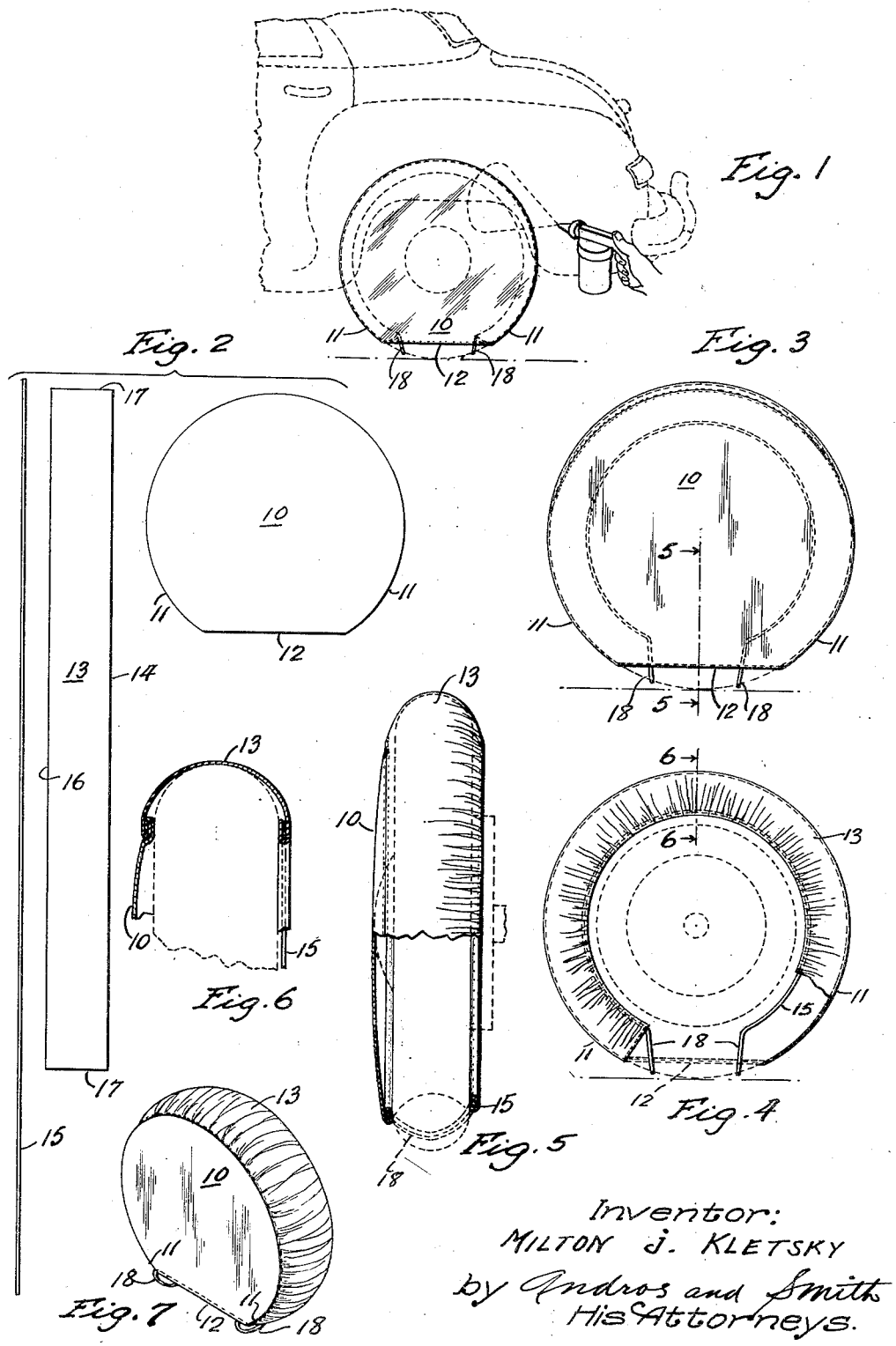
Inventor:
MILTON J. KLETSKY
by Andros and Smith
His Attorneys.

Patented Sept. 15, 1953

2,652,023

UNITED STATES PATENT OFFICE 2,652,023

PAINT SPRAY MASK FOR AUTO TIRES

Milton J. Kletsky, Albany, N. Y.

Application August 17, 1951, Serial No. 242,247

3 Claims. (Cl. 118—505)

This invention relates to wheel masks for automotive vehicles, having particular reference, for example, to paint spray masks adapted to be affixed in position around a wheel, and, especially, around a pneumatic tire on a wheel rim mounted on such a vehicle when the tire is supporting the vehicle on a ground surface, to protect the wheel from paint spray as well as dirt, grit, grime, etc., and the provision of such a mask is a principal object of the invention.

Heretofore, for example, in paint shops, it has been customary to use any kind of cloth, paper or other covering material, draped, or otherwise placed around such wheels when paint spraying an automobile to protect the wheel; and such materials or methods were used largely to avoid the expense and inconvenience involved in following conventional masking practices as is done in masking other parts of such a vehicle with masking tape. However, such materials become saturated with paint and consequently, messy, cumbersome and ultimately useless.

It has long been felt in the industry that it would be a distinct improvement to overcome the foregoing and other difficulties and disadvantages and this now has been accomplished by means of the present invention.

Generally, therefore, it is also an object of the invention to provide such a mask, which is economic of manufacture, simple yet sturdy and durable of construction, re-useable, time saving during use and otherwise well suited to the purposes for which it is intended.

More specifically, it is an object of the invention to provide such an article of manufacture especially adapted for use as a paint spray mask when positioned around a pneumatic tire on a wheel rim mounted on an automotive vehicle when such tire is resting on a ground surface, the mask constituting a sheet of pliable material having a substantially circular, peripheral edge extending through an arc substantially in excess of 180° as measured around the geometrical center thereof, the ends of the arc being joined by a chord, and elastic means secured to the circular portion to draw the same together, the sheet being so constructed and arranged, when applied to the tire, or wheel, that it will protectively cover at least the whole of the rim and included structure of the wheel, as well as substantially all of the tire, across the exposed outside face thereof without raising the wheel and tire from the ground surface, or "jacking up" the vehicle, thereby preventing paint spray from reaching the metallic or other portions of the wheel as well as substantially all of the tire.

Other specific objects of the invention are the provisions of such a mask in which the elastic means comprises an elastic band adapted to extend from the ends of the chord transversely around the bottom of the tire to intermediate portions thereof; in which the sheet of material constituting the mask comprises a substantially circular blank to cover the front or exposed side of the wheel and wall of the tire, and an elongated, rectangularly shaped strip or blank secured to the circular blank to cover the top and contact the other side wall of the tire; and in which such sheets, blank, or blanks, are composed of plastic material having physical characteristics which make the same non-porous, non-absorbent and compatible with paint spray solvents or thinners, and which will stand washing therewith to make the mask re-useable.

Other objects of the invention will in part be obvious and will in part appear hereinafter.

The invention accordingly comprises an article of manufacture possessing the features, properties, characteristics and relation of elements which will be exemplified in the article hereinafter described and the scope of the application of which will be indicated in the claims.

For a fuller understanding of the nature and objects of the invention, reference should be had to the following detailed description, taken in connection with the accompanying drawing, in which:

Fig. 1 is an elevational view, illustrating a preferred form of mask embodying my invention positioned on the left rear tire and wheel resting on a ground surface and shown supporting the rear portion of a vehicle depicted in dotted lines as the latter is being sprayed;

Fig. 2 is a plan view of a substantially circular blank of material, an elongated blank, or strip, and an elastic band which, when assembled, constitute a preferred form of paint spray mask embodied by the invention;

Fig. 3 is a front elevational view, somewhat enlarged, showing the elements of Fig. 2 assembled and applied to a tire and wheel;

Fig. 4 is a rear elevational view of Fig. 3, with a fragmentary portion removed therefrom;

Fig. 5 is an enlarged end elevational view, partly in section, taken along the lines 5—5 and looking in the direction of the arrows;

Fig. 6 is an enlarged fragmentary view, in section, taken along the lines 6—6 of Fig. 4, and looking in the direction of the arrows; and Fig. 7 is a perspective view of a preferred form of the mask embodying the invention.

Referring now more particularly to Fig. 2 of the drawing, there is shown a blank 10 which is substantially circular in configuration in that its peripheral edge 11 extends through an arc substantially in excess of 180° as measured around the geometrical center thereof. The blank is cut to provide a straight edge 12 so that the terminal ends of the arc may be said to be joined by a chord.

An elongated strip, or rectangularly shaped blank 13 is secured along one of its marginal edges, 14 for example, to the circular peripheral edge 11 in any suitable manner, as by stitching, stapling or heat sealing. In this connection, attention is called to the fact that the blank should comprise a material having such physical characteristics as substantial non-absorbency, non-porosity, compatibility with solvents or paint thinners so that accumulated paint spray can readily be washed therefrom and the mask made re-useable for long periods of time. Such materials, preferably, therefore are of plastic sheeting such as those known to the trade as Vinylite, or Pliofilm, Koroseal, Saran and the like. These are sufficiently pliable and will remain so because of their relative non-porous or non-absorbent characteristics.

An elastic means, for example, an elastic band 15, is suitably secured to the other long marginal edge 16 of the strip 13 in such a manner that substantially equal end portions of the band extend beyond the short ends 17, 17 of the strip 13. These end portions are secured to the chord or straight edge 12 at points inwardly of peripheral arc portions 11, 11, and provide retaining loops 18, 18.

In its completed form the mask, along the elongated strip portion, and particularly in the area of the elastic band will give a shirred or accordion pleated effect. This will allow ample room for expansion so the same readily may be opened and applied to any size tire, or wheel, for immediate use; and, of course, the mask can be removed with equal readiness.

It will thus be seen that the objects herein before set forth can readily and efficiently be attained by following the principles of the invention described; and since certain changes may be made in the above article, and different embodiments of the invention could be made without departing from the scope thereof, it is intended that all matter contained in the above description, or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A mask adapted to cover the outside surface of a wheel, rim and pneumatic tire including the tread, on an automobile while the same is resting on a ground surface to protect the wheel, rim and tire from paint spray while the body of the automobile is being sprayed, comprising a disc-like sheet of material adapted to cover the outside surface of the wheel, rim and tire, and to conform to the circular formation of said tire and wheel except for a relatively short straight edge portion adjacent said ground surface when said mask is in adjusted position on a tire equipped wheel; an elongated strip of material to cover the tread surface of the tire and secured along one side edge thereof to the circular peripheral edge portion of said disc-like sheet and terminating adjacent the ends of said straight edge portion; an elastic member, stretchable along its longitudinal axis, secured along the other side edge of said elongated strip, and loops of similarly stretchable material connecting the ends of said other side edge and said straight edge, and adapted to extend transversely across the tread surface of said tire on opposite sides thereof adjacent the point where the tire contacts said ground surface.

2. A mask as defined in claim 1 and further characterized in that said loops are provided by extensions of said elastic member.

3. A mask as defined in claim 1, and further characterized in that said stretchable member comprises a woven fabric covered rubber material.

MILTON J. KLETSKY.

References Cited in the file of this patent

UNITED STATES PATENTS

| Number | Name | Date |
|---|---|---|
| 2,552,287 | Layne | May 13, 1948 |